(12) United States Patent
Geary et al.

(10) Patent No.: US 10,851,019 B2
(45) Date of Patent: Dec. 1, 2020

(54) WATERLESS INTEGRAL WATERPROOFING

(71) Applicant: GCP Applied Technologies Inc., Cambridge, MA (US)

(72) Inventors: David T. Geary, Hingham, MA (US); Elizabeth Burns, Windham, NH (US); Nathan A. Tregger, Northborough, MA (US)

(*) Notice: Subject to any disclaimer, the term of this patent is extended or adjusted under 35 U.S.C. 154(b) by 0 days.

(21) Appl. No.: 16/398,398

(22) Filed: Apr. 30, 2019

(65) Prior Publication Data

US 2019/0330110 A1    Oct. 31, 2019

Related U.S. Application Data

(60) Provisional application No. 62/664,409, filed on Apr. 30, 2018.

(51) Int. Cl.

| | |
|---|---|
| *C04B 24/42* | (2006.01) |
| *C04B 40/00* | (2006.01) |
| *C04B 24/08* | (2006.01) |
| *C04B 24/00* | (2006.01) |
| *C04B 24/32* | (2006.01) |
| *C04B 24/20* | (2006.01) |
| *C04B 24/26* | (2006.01) |
| *C04B 24/10* | (2006.01) |
| *C04B 111/27* | (2006.01) |
| *C04B 103/50* | (2006.01) |
| *C04B 103/30* | (2006.01) |

(52) U.S. Cl.
CPC ............ *C04B 24/42* (2013.01); *C04B 24/003* (2013.01); *C04B 24/08* (2013.01); *C04B 24/10* (2013.01); *C04B 24/20* (2013.01); *C04B 24/2641* (2013.01); *C04B 24/32* (2013.01); *C04B 40/0039* (2013.01); *C04B 2103/302* (2013.01); *C04B 2103/50* (2013.01); *C04B 2111/27* (2013.01)

(58) Field of Classification Search
CPC ..... C04B 24/003; C04B 24/005; C04B 24/08; C04B 24/10; C04B 24/20; C04B 24/2641; C04B 24/2647; C04B 24/32; C04B 24/42; C04B 28/02; C04B 40/0039; C04B 2103/30; C04B 2103/302; C04B 2103/50; C04B 2111/27

See application file for complete search history.

(56) References Cited

U.S. PATENT DOCUMENTS

| | | |
|---|---|---|
| 5,393,330 A | 2/1995 | Chen et al. |
| 6,207,720 B1 | 3/2001 | Maeda et al. |
| 6,537,366 B1 | 3/2003 | Supplee, Sr. |
| 7,037,367 B2 | 5/2006 | Mauchamp et al. |
| 7,704,563 B2 | 4/2010 | Smith et al. |
| 7,807,015 B2 | 10/2010 | Ram et al. |
| 7,867,960 B2 | 1/2011 | Yamaguchi et al. |
| 7,964,286 B2 | 6/2011 | Smith et al. |
| 7,972,659 B2 | 7/2011 | Hill |
| 8,067,346 B2 | 11/2011 | Yamaguchi et al. |
| 8,153,566 B2 | 4/2012 | Yamaguchi et al. |
| 8,513,338 B2 | 8/2013 | Rodrigues |
| 8,580,030 B2 | 11/2013 | Kanduth et al. |
| 8,974,595 B2 | 3/2015 | Guyot et al. |
| 2010/0251431 A1 | 9/2010 | Sakamoto et al. |
| 2012/0048147 A1 | 3/2012 | Gehrig et al. |
| 2015/0148449 A1 | 5/2015 | Domanowski et al. |
| 2016/0376440 A1 | 12/2016 | Naidoo et al. |

FOREIGN PATENT DOCUMENTS

| | | |
|---|---|---|
| CN | 103819127 | 5/2014 |
| CN | 103979845 | 8/2014 |
| KR | 101774910 B1 * | 9/2017 |
| WO | 2016062866 | 4/2016 |

OTHER PUBLICATIONS

MASTERPEL® 240 Technical Data Sheet, BASF Corporation, 3 pages.
Justnes, "Low water permeability through hydrophobicity", SINTEF Building and Infrastructure, COIN Project report 1, 2008, Oslo, Norway. 36 pages.
Copenheaver, PCT International Search Report & The Written Opinion, PCT/US2019/029410, dated Jul. 19, 2019, 9 pages.

* cited by examiner

*Primary Examiner* — Anthony J Green
(74) *Attorney, Agent, or Firm* — Craig K. Leon; Nilay J. Choksi

(57) ABSTRACT

Described are admixture composition and method for integrally waterproofing cementitious compositions, such as concrete and mortar, wherein an organosilicon compound (e.g., silane) is mixed with animal oil, vegetable oil, or mixture thereof, and defoaming agent. The organosilicon/oil mixtures of the present invention enhances the water repellent efficacy of the organosilicon, even as it displays inherently greater product stability, as compared to emulsion-based (and thus substantial free-water containing) admixture formulations of the prior art. Cementitious materials made in accordance with the present invention demonstrate excellent air consistency and air neutrality.

17 Claims, 3 Drawing Sheets

WATERLESS INTEGRAL WATERPROOFING

FIELD OF THE INVENTION

The present invention relates to waterproofing of concrete, and, more particularly, to an admixture composition and method for integrally waterproofing cementitious materials using a waterless blend of an animal or vegetable oil with an organosilicon.

BACKGROUND OF THE INVENTION

It is known to incorporate any number of hydrophobic materials into cementitious compositions, such as concrete and mortar, to prevent their breakdown due to subsequent water infiltration. As noted in WO 2016/062866 A1, the three major hydrophobic groups are fatty acids, waxes, and organosilicons.

However, a problem with using fatty acids and wax compounds is that these must be used in such high dosage amounts to achieve water-repellency that the resultant concrete or mortar loses strength. See "Low Water Permeability Through Hydrophobicity," Justnes, H., SINTEF Report (2008).

On the other hand, organosilicon materials, such as silanes, offer better dosage efficiency. But fluctuations in temperature or pH, and introduction of impurities such as salts, can destabilize silane emulsions, causing separation: the heavier water will sink to the bottom of the storage tank (where pump or valve dispensing mechanisms are often located); and the silane material will rise towards the top of the tank. Thus, less silane will be dispensed into subsequent concrete batches; the concrete could suffer in terms of internal waterproofing capability and freeze-thaw durability; and results will be inconsistent.

The present inventors believe that a novel admixture composition and method are needed to provide robust and effective integral waterproofing of cementitious articles.

SUMMARY OF THE INVENTION

In surmounting the disadvantages of the prior art, the present invention provides an admixture composition and method for integrally waterproofing cementitious compositions, such as concrete, mortar, masonry, and other cementitious compositions.

Admixture compositions of the invention have excellent stability of product formulation and dosage efficiency, and confer excellent integral water repellency to cementitious compositions.

An exemplary admixture composition of the present invention for integrally waterproofing a cementitious material, comprises:

(A) an animal oil, a vegetable oil, or mixture thereof;
(B) an organosilicon having a structural formula chosen from

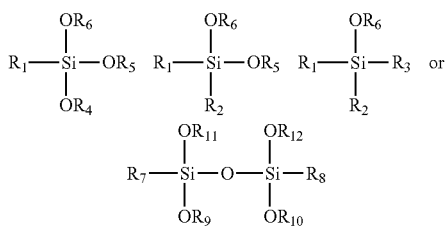

wherein $R_1$ $R_2$ $R_3$ $R_7$ and $R_8$ represent a $C_6$ to $C_{20}$ alkyl group, and $R_4$, $R_5$, $R_6$, $R_9$, $R_{10}$, $R_{11}$, and $R_{12}$ each independently represent a $C_1$ to $C_5$ alkyl group; and (C) at least one air defoamer for detraining air in a hydratable cementitious composition;
wherein the ratio (A:B) between components (A) and (B) is 99:1 to 50:50 based on weight of components; and
wherein the ratio (B:C) between components (B) and (C) is 99.9:0.1 to 90:10 based on weight of components.

In a preferred embodiment, a vegetable oil is used, preferably a canola oil or rapeseed oil, and the organosilicon is preferably a silane, preferably an alkyltrialkoxysilane, and, most preferably, an octyltriethoxysilane.

In further exemplary embodiments, the weight ratio of the vegetable oil to silane is more preferably 98:2 to 40:60, and, most preferably, the weight ratio of the vegetable oil to silane is 95:5 to 20:80; and, preferably, the weight ratio of silane to defoamer ratio is 99.9:0.1 to 90:10; more preferably, 99.9:0.1 to 97.5:2.5; and, most preferably, 99.9:0.1 to 99:1.

Defoamers are typically non-ionic surfactants, with the water soluble portion being, for example, a polyoxyethylene, a sugar or a phosphate. The hydrophobic groups are alkyl, fatty acid chains or polyoxypropylene. Specific choices are based on experience and stability or solubility in the formulation. Preferred classes of defoamers are copolymers of PEG/PPG and trialkyl phosphates.

Compared to prior art waterproofing admixtures, which are based on emulsions of organosilicons or oils and water, the admixture compositions of the present invention provide a formulation having relatively greater stability. The admixtures of the present invention are also not believed to alter the air content of the concretes or mortars substantially or to hinder the ability to entrain air in these cementitious compositions.

The present inventors were surprised to discover that the formulation of the organosilicon in vegetable oil increased the waterproofing efficiency of the organosilicon.

Further advantages and features of the present invention are described in detail hereinafter.

BRIEF DESCRIPTION OF DRAWINGS

An appreciation of the benefits and features of the invention may be more readily comprehended when the following written description of preferred embodiments is considered in conjunction with the drawings, wherein.

DETAILED DESCRIPTION OF EXEMPLARY EMBODIMENTS

Figure 1:
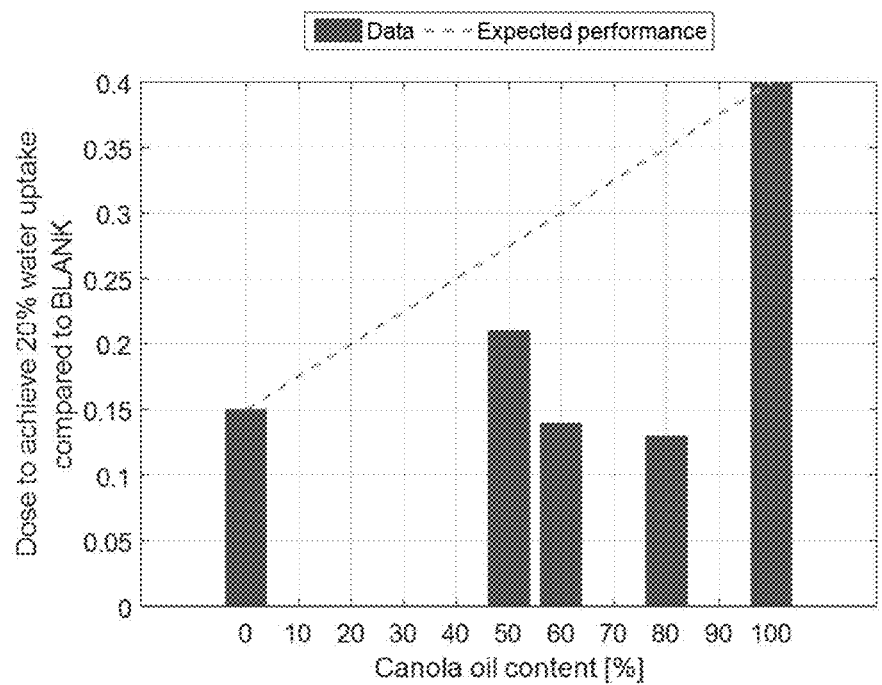
FIG. 1 is a diagram which shows the performance of formulations with different ratios of canola oil to silane.
Figure 2:
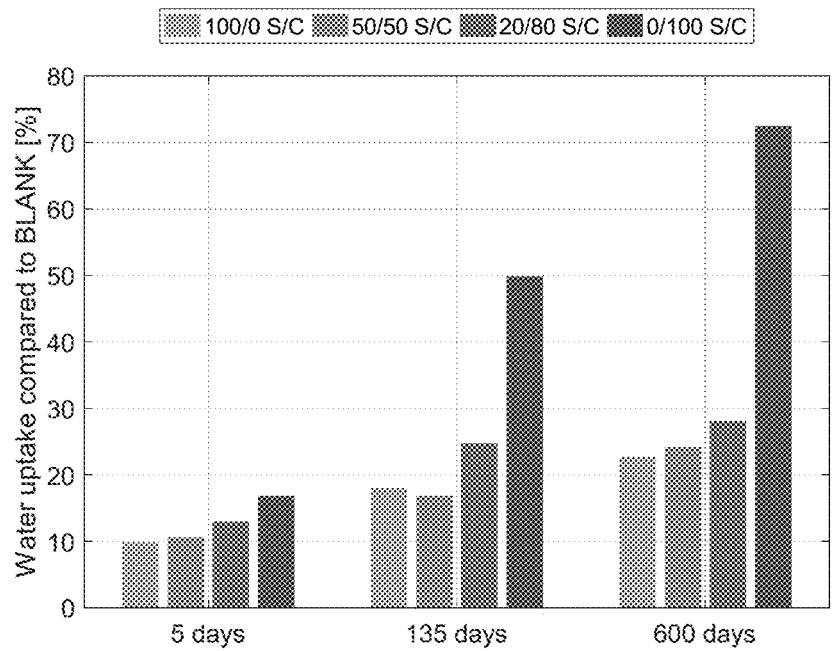
FIG. 2 is a diagram which shows water uptake over time for a 100% silane formulations versus an exemplary formulation of the present invention.

As used herein, the terms "cement" and "cementitious composition" (which are synonymous with "cement composition") are understood to refer to pastes, mortars, and concrete compositions comprising a hydratable cement binder. The terms "paste", "mortar" and "concrete" are terms of art: "pastes" are mixtures composed of a hydratable cement binder (usually, but not exclusively, Portland cement, masonry cement, or mortar cement, and this binder may also include limestone, hydrated lime, fly ash, granulated blast furnace slag, pozzolans, and silica fume or other materials commonly included in such cements) and water; "mortars" are pastes additionally including fine aggregate (e.g., sand), and "concretes" are mortars additionally including coarse aggregate (e.g., crushed gravel, stone).

The cementitious compositions tested in this invention may be formed by mixing required amounts of certain materials, e.g., a hydratable cement, water, and fine and/or coarse aggregate, as may be applicable to make the particular cement composition being formed.

The term "vegetable oil" as used herein shall mean and refer to a product (whether in liquid, paste, or solid form) extracted from the seeds, fruit, or nuts of plants and sap trees (such as hevea sap, maple, lignosulfonates, pine tree sap). Vegetable oils are generally considered to be a mixture of mixed glycerides (See e.g., Hawley's Condensed Chemical Dictionary, Ed. N. Irving Sax, Richard J. Lewis, Sr., 11th Ed. (Von Nostrand Reinhold Company, New York 1987), page 1219).

Exemplary vegetable oils contemplated for use in the present invention include but are not limited to: rapeseed oil, sunflower oil, soy bean oil, castor oil, peanut oil, grape seed oil, corn oil (e.g., including corn germ oil), canola oil, coconut oil, linseed oil, sesame oil, olive oil, palm oil, almond oil, avocado oil, china wood oil, cocoa oil, safflower oil, hemp seed oil, walnut oil, poppy seed oil, oiticaca oil (e.g., obtained by expression from the seeds of the Brazilian oiticaca tree, *Licania rigida*), palm nut oil, perilla oil, pecan oil, tung oil, pine tar oil, and mixtures thereof.

Further embodiments may employ a vegetable oil derivative that may be chosen from mono and diglycerides of $C_6$-$C_{30}$ fatty acids, esters of $C_6$-$C_{30}$ fatty acids, ethoxylated compounds of $C_6$-$C_{30}$ fatty acids, $C_6$-$C_{30}$ fatty amines, $C_6$-$C_{30}$ fatty amides, tall oil derivatives, or mixtures thereof.

The list of potential vegetable oil and animal oil and their derivatives believed useful for purposes of the present invention is potentially extensive. However, a further helpful list is provided in World Patent Application No. WO 85/05066 (International Publication No.) of Nielsen et al., International Patent Application No. PCT/CK85,00043, beginning at page 16. The derivatives include: hexyl acetate, 2-ethylhexyl acetate, octyl acetate, isooctyl acetate, cetyl acetate, dodecyl acetate, tridecyl acetate; butyl butyrate, isobutyl butyrate, amyl isobutyrate, hexyl butyrate, heptyl butyrate, isoheptyl butyrate, octyl butyrate, isooctyl butyrate, 2-ethylhexyl butyrate, nonyl butyrate, isononyl butyrate, cetyl butyrate, isocetyl butyrate; ethyl hexanoate, propyl hexanoate, isopropyl hexanoate, butyl hexanoate, isobutyl hexanoate, amyl hexanoate, hexyl hexanoate, heptyl hexanoate, isoheptyl hexanoate, octyl hexanoate, 2-ethylhexyl hexanoate, nonyl hexanoate, isonynyl hexanoate, cetyl hexanoate, isocetyl hexanoate; methyl octanoate, ethyl octanoate, propyl octanoate, isopropyl octanoate, butyl octanoate, isobutyl octanoate, amyl octanoate, hexyl octanoate, heptyl octanoate, isoheptyl octanoate, octyl octanoate, isooctyl octanoate, 2-ethylhexyl octanoate, nonyl octanoate, isononyl octanoate, cetyl octanoate, isocetyl octanoate; methyl 2-ethylhexanoate, ethyl 2-ethylhexanoate, propyl 2-ethylhexanoate, isopropyl 2-ethylhexanoate, butyl 2-ethylhexanoate, isobutyl 2-ethylhexanoate, isoamyl 2-ethylhexanoate, hexyl 2-ethylhexanoate, heptyl 2-ethylhexanoate, isoheptyl 2-ethylhexanoate, octyl 2-ethylhexanoate, isooctyl 2-ethylhexanoate, 2-ethylhexyl 2-ethylhexanoate, nonyl 2-ethylhexanoate, isononyl 2-ethylhexanoate, cetyl 2-ethylhexanoate, isocetyl 2-ethylhexanoate; methyl decanoate, ethyl decanoate, propyl decanoate, isopropyl decanoate, butyl decanoate, isobutyl decanoate, isoamyl decanoate, hexyl decanoate, heptyl decanoate, isoheptyl decanoate, octyl decanoate, isooctyl decanoate, 2-ethylhexyl decanoate, nonyl decanoate, isononyl decanoate, cetyl decanoate, isocetyl decanoate; methyl laurate, ethyl laurate, propyl laurate, isopropyl laurate, butyl laurate, isobutyl laurate, isoamyl laurate, hexyl laurate, heptyl laurate, isoheptyl laurate, octyl laurate, isooctyl laurate, 2-ethylhexyl laurate, nonyl laurate, isononyl laurate, cetyl laurate, isocetyl laurate; ethyl oleate, propyl oleate, isopropyl oleate, butyl oleate, isobutyl oleate, isoamyl oleate, hexyl oleate, heptyl oleate, isoheptyl oleate, octyl oleate, isooctyl oleate, 2-ethylhexyl oleate, nonyl oleate, isononyl oleate, cetyl oleate, isocetyl oleate; diethyl succinate, dipropyl succinate, diisopropyl succinate, dibutyl succinate, diisobutyl succinate, diisoamyl succinate, dihexyl succinate, diheptyl succinate, diisoheptyl succinate, dioctyl succinate, diisooctyl succinate, di-2-ethylhexyl succinate, dinonyl succinate, diisononyl succinate, dicetyl succinate, diisocetyl succinate; dimethyl adipate, diethyl adipate, dipropyl adipate, diisopropyl adipate, dibutyl adipate, diisobutyl adipate, diisoamyl adipate, dihexyl adipate, diheptyl adipate, diisoheptyl adipate, dioctyl adipate, diisooctyl adipate, di-2-ethylhexyl adipate, dinonyl adipate, diisononyl adipate, dicetyl adipate, diisocetyl adipate; isopropyl myristate, isobutyl myristate, butyl myristate, amyl myristate, hexyl myristate, heptyl myristate, isoheptyl myristate, octyl myristate, 2-ethylhexyl myristate, nonyl myristate, isononyl myristate, cetyl myristate, isocetyl myristate; isopropyl palmitate, isobutyl palmitate, butyl palmitate, amyl palmitate, hexyl palmitate, heptyl palmitate, isoheptyl palmitate, octyl palmitate, 2-ethylhexyl palmitate, nonyl palmitate, isononyl palmitate, cetyl palmitate, isocetyl palmitate; isopropyl stearate, isobutyl stearate, butyl stearate, amyl stearate, hexyl stearate, heptyl stearate, isoheptyl stearate, octyl stearate, 2-ethylhexyl stearate, nonyl stearate, isononyl stearate, cetyl stearate, isocetyl stearate, and mixtures thereof.

Vegetable oils useful in the invention may be essential oils. The term "essential" means and refers to oils that contain the characteristic odor or flavor (i.e., the essence) of the original flower or fruit. An essential oil is usually obtained by steam distillation of the flowers or leaves or cold pressing of the skin or other parts (e.g., stem, flower, twigs, etc.). Exemplary essential oils include orange, grapefruit, lemon, citrus, pine tree, and mixtures thereof.

In other exemplary compositions of the invention, animal oil or its derivative, can be used instead of, or in combination with, a vegetable oil or its derivative. The term "animal oil" refers to a product (whether oil, wax, or solid form) obtained from any animal substance, such as bone or other body component. Examples include lard oil, bone oil, herring oil, cod liver oil, neat foot oil, sardine oil, lanoline oil, fish oil, sheep wool oil, tallow oil, and bees wax. Derivatives of animal oils preferably include mono and diglycerides of $C_6$-$C_{30}$ fatty acids, esters of $C_6$-$C_{30}$ fatty acids, ethoxylated compounds of $C_6$-$C_{30}$ fatty acids, $C_6$-$C_{30}$ fatty amines, $C_6$-$C_{30}$ fatty amides, tall oil derivatives, and mixtures thereof.

The terms "vegetable oil" and "mineral oil" as used herein are each intended to include their respective derivatives.

It will also be understood that vegetable oils and animal oils contemplated for use in the present invention may wholly or partially include oils which have been recycled. For example, vegetable oils that have been used for cooking and recycled may provide economic advantages when used in the invention.

In a first example embodiment, the invention provides an admixture composition for integrally waterproofing a cementitious material, which comprises:

(A) an animal oil, a vegetable oil, or mixtures thereof;

(B) an organosilicon having a structural formula chosen from

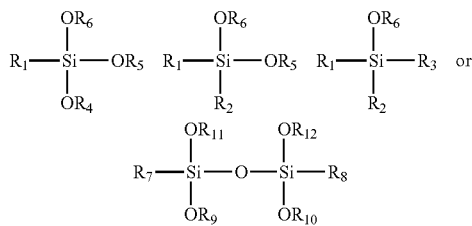

wherein $R_1$ $R_2$ $R_3$ $R_7$ and $R_8$ represent a $C_6$ to $C_{20}$ alkyl group, and $R_4$, $R_5$, $R_6$, $R_9$, $R_{10}$, $R_{11}$, and $R_{12}$ each independently represent a $C_1$ to $C_5$ alkyl group; and (C) at least one air defoamer for detraining air in a hydratable cementitious composition;

wherein the ratio (A:B) between components (A) and (B) is 99:1 to 50:50 based on weight of components (and, more preferably 98:2 to 40:60; and, most preferably, 95:5 to 20:80); and wherein the ratio (B:C) between components (B) and (C) is 99.9:0.1 to 90:10 based on weight of components; more preferably, 99.9:0.1 to 97.5:2.5; and, most preferably, 99.9: 0.1 to 99:1.

In a first aspect of the first example embodiment, the admixture composition is substantially free or devoid of water, which means that the content of free water is less than five percent (5%) based on total weight of the admixture composition; more preferably, the content of free water is less than 2.5%; and, most preferably, the amount of water is less than 1.0%, based on total weight of the admixture composition.

The admixture compositions described herein are most preferably to be considered as oil-based formulations. Although moisture may enter into the formulations, such as through atmospheric vapor, it is understood that total water amount should be as low as possible.

In a second example embodiment of the admixture composition, which may be based on any of the first example embodiment above, the ratio (A:B) between components A and B is 98:2 to 40:60 based on weight of components.

In a third example embodiment of the admixture composition, which may be based on any of the first through second example embodiments above, the ratio (A:B) between components A and B is 95:5 to 20:80 based on weight of components.

In a fourth example embodiment of the admixture composition, which may be based on any of the first through third example embodiments above, the admixture composition comprises a vegetable oil chosen from rapeseed oil, sunflower oil, soy bean oil, castor oil, peanut oil, grape seed oil, corn oil (e.g., including corn germ oil), canola oil, coconut oil, linseed oil, sesame oil, olive oil, palm oil, almond oil, avocado oil, china wood oil, cocoa oil, safflower oil, hemp seed oil, walnut oil, poppy seed oil, oiticaca oil (e.g., obtained by expression from the seeds of the Brazilian oiticaca tree, *Licania rigida*), palm nut oil, perilla oil, pecan oil, tung oil, and pine tar oil. Preferred are canola oil, sunflower oil, corn oil, soybean oil, olive oil, peanut, coconut oil, or mixture thereof. In a fifth example embodiment of the admixture composition, which may be based on any of the first through fourth example embodiments above, the admixture composition comprises a vegetable oil chosen from mono and diglycerides of $C_6$-$C_{30}$ fatty acids, esters of $C_6$-$C_{30}$ fatty acids, ethoxylated compounds of $C_6$-$C_{30}$ fatty acids, $C_6$-$C_{30}$ fatty amines, $C_6$-$C_{30}$ fatty amides, tall oil derivatives, and mixtures thereof.

In a sixth example embodiment of the admixture composition, which may be based on any of the first through fifth example embodiments above, the vegetable oil is chosen from canola oil, rapeseed oil, and mixture thereof.

In a seventh example embodiment of the admixture composition, which may be based on any of the first through sixth example embodiments above, the organosilicon is a silane.

In an eighth example embodiment of the admixture composition, which may be based on any of the first through seventh example embodiments above, the silane is octyltriethoxysilane.

In a ninth example embodiment of the admixture composition, which may be based on any of the first through eighth example embodiments above, the air defoamer is chosen from tributyl phosphate (e.g., preferably tri-isobutylphosphate), a polyoxyalkylene, or a mixture thereof.

In a first aspect of the ninth example embodiment, the air defoamer of the admixture composition is tri-butylphosphate, and more preferably tri-iso-butylphosphate.

In a second aspect of the ninth example embodiment, the air defoamer of the admixture composition is a polyoxyalkylene defoamer. The polyoxyalkylene defoamer may have polyethylene oxide groups ("EO"), polypropylene oxide groups ("PO"), or a mixture thereof. In preferred polyoxalkylene defoamers, the ratio of PO:EO groups is preferably 1:1 to 1:5. In a further example, the defoamer may be a polyalkoxylated polyalkylene polyamine defoamer as taught, for example, in U.S. Pat. No. 8,187,376 of Kuo (owned by the common assignee hereof).

In a tenth example embodiment, which may be based on any of the first through ninth example embodiments above, the admixture composition is devoid hydroxyl groups.

In an eleventh example embodiment, which may be based on any of the first through tenth example embodiments above, the admixture composition further comprises admixture composition may further comprise sugars or carbohydrates, water reducers such as lignin, naphthalene sulfonates or polycarboxylate ether polymers.

In an twelfth example embodiment of the admixture composition, the present invention provides a cementitious composition, comprising a cement binder and the admixture composition based on any of the foregoing first through eleventh example embodiments set forth above.

In a first aspect of this twelfth example embodiment, the cementitious composition further comprises fine aggregates (e.g., sand), coarse aggregates (e.g., stones, crushed gravel), or a mixture thereof.

In a thirteenth example embodiment, the present invention provides a method for integrally waterproofing a cementitious material, comprising: combining a cement binder with the admixture composition of any of the first through twelfth example embodiments described above.

In a first aspect of this thirteenth example embodiment, the admixture composition (components A, B, and C) are introduced into a concrete mix load as contained in the rotatable mixer drum of a concrete delivery truck, either at the batch plant or at the construction site where the concrete mix is delivered and placed. More preferably, the admixture is introduced into the concrete mix contained in a truck mixer drum at the construction site, by using an automated concrete slump monitoring system.

Automated slump monitoring systems suitable for addition of chemicals during mixing, transit, and/or at delivery, are commercially available from GCP Applied Technologies Inc., Cambridge, Mass. (USA) under the VERIFI® trade name. These systems are especially preferred for confirming when a fluid admixture has become uniformly mixed into the concrete load. The VERIFI® Systems employ hydraulic pressure sensors which allow for sampling numerous times throughout the rotation of the mixer drum. (See e.g., U.S. Pat. Nos. 8,020,431; 8,118,473; 8,311,678; 8,491,717; 8,727,604; 8,746,954; 8,764,273; 8,818,561; 8,989,905; 9,466,803; 9,550,312; PCT/US2015/025054 (Publ. No. WO 2015/160610 A1); and PCT/US2014/065709 (Publ. No. WO2015073825 A1)).

Alternatively, the concrete monitoring system may be based on use of a force sensor mounted within the mixer drum. See e.g., U.S. Pat. Nos. 8,848,061 and 9,625,891 of Berman of Sensocrete Inc. (owned by the common assignee hereof, U.S. Pat. No. 9,199,391 of Denis Beaupre et al. (Command Alkon Inc.), or US Publication No. 2009/0171595 and WO 2007/060272 of Benegas.

In a fourteenth example embodiment of the admixture composition, the present invention provides a cementitious composition comprising:

(A) a cement binder;
(B) an animal oil, a vegetable oil, or mixture thereof;
(C) an organosilicon having a structural formula chosen from

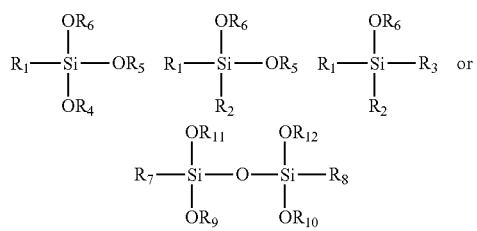

wherein $R_1$ $R_2$ $R_3$ $R_7$ and $R_8$ represent a $C_6$ to $C_{20}$ alkyl group, and $R_4$, $R_5$, $R_6$, $R_9$, $R_{10}$, $R_{11}$, and $R_{12}$ each independently represent a $C_1$ to $C_5$ alkyl group; and (D) at least one air defoamer for detraining air from a hydratable cementitious composition;

wherein the weight ratio (B:C) between components (B) and (C) is 99:1 to 50:50 based on weight of these components (and, more preferably, 98:2 to 40:60; and, most preferably, 95:5 to 20:80);

wherein the weight ratio (C:D) between components (C) and (D) is 99.9:0.1 to 90:10 based on the weight of these components (more preferably, 99.9:0.1 to 97.5:2.5; and, most preferably, 99.9:0.1 to 99:1); and wherein the weight ratio (A:B+C+D) of component (A) to components (B), (C), plus (D) is 1:0.02 to 1:0.15 based on the weight of these components.

In a first aspect of this fourteenth example embodiment, components (B), (C), and (D) may be based on any of the foregoing first through ninth example embodiments above.

In a fifteenth example embodiment, the present invention provides a method for integrally waterproofing a cementitious composition, comprising: introducing to a cement binder the following components:

(A) an animal oil, a vegetable oil, or mixture thereof;
(B) an organosilicon having a structural formula chosen from

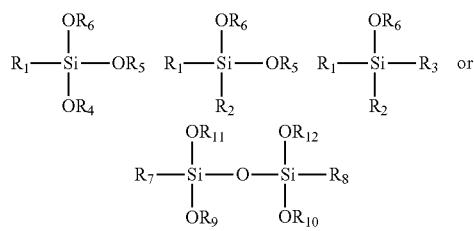

wherein $R_1$ $R_2$ $R_3$ $R_7$ and $R_8$ represent a $C_6$ to $C_{20}$ alkyl group, and $R_4$, $R_5$, $R_6$, $R_9$, $R_{10}$, $R_{11}$, and $R_{12}$ each independently represent a $C_1$ to $C_5$ alkyl group; and (C) at least one air defoamer for detraining air from a hydratable cementitious composition;

wherein the weight ratio (A:B) between components (A) and (B) is 99:1 to 50:50 based on weight of these components (and, more preferably, 98:2 to 40:60; and, most preferably, 95:5 to 20:80);

wherein the weight ratio (B:C) between components (B) and (C) is 99.9:0.1 to 90:10 based on the weight of these components (more preferably, 99.9:0.1 to 97.5:2.5; and, most preferably, 99.9:0.1 to 99:1); and wherein the weight ratio (A:B+C+D) of component (A) to components (B), (C), plus (D) is 1:0.02 to 1:0.15 based on the weight of these components.

In a fifteenth example embodiment, the components B, C, and D may be based on any of the foregoing second through eleventh embodiments, although it is possible that components A and B can be premixed together and directly combined with the cement binder or into concrete or mortar directly, and component C (air defoamer) can be combined with the cement binder or into the concrete or mortar at a different time.

In a first aspect of this fifteenth example embodiment, the method further comprises: adding an air entrainer into concrete or mortar. In further exemplary embodiments, both air detrainer and air entrainer can be added into the concrete or mortar together.

In still further exemplary admixture compositions, methods, and cementitious compositions of the invention, an air entraining agent is used in combination with the air detraining agent thereby to establish a uniform and distributed microbubble structure within a concrete or mortar.

While the invention is described herein using a limited number of embodiments, these specific embodiments are not intended to limit the scope of the invention as otherwise described and claimed herein. Modifications and variations from the described embodiments exist. More specifically, the following examples are given as a specific illustration of embodiments of the claimed invention. It should be understood that the invention is not limited to the specific details set forth in the examples. All parts and percentages in the examples, as well as in this specification, are by percentage dry weight unless otherwise specified.

EXEMPLIFICATIONS

Example 1

In this example, a modified ASTM C1403-13 test was used to evaluate water adsorption of masonry mortar. Instead of 2"×2" mortar cubes, an Intensive Compaction Tester (ICT-100R from Invelop Oy of Savonlinna Finland) was used to produce cylinders with a diameter of 4" and a height of 4" after mortar mixing. Five different admixture compositions of the present invention, each comprising different combinations of octyltriethoxyysilane (S) and canola oil (C), were tested for their water uptake property in mortar, including: a) 100S/0C, 50S/50C, 40S/60C, 20S/80C and 0S/100C. Both the octyltriethoxyysilane and canola oil contents were based on actives content. A mortar mix having the following constituents was used: 3266 grams of sand (oven dried), 883 grams of cement, 217 grams of water. A 9-minute mixing protocol was used consisting of two minutes of mixing the sand, water, and integral water repellent admixture; adding the cement; then continuing to mix for another two minutes; allowing the cementitious mixture to rest for three minutes; and then mixing for another two minutes. All mixing was done at medium speed on a Hobart mixer. The modified ASTM C1403 test was performed for each formulation at several dosages in order to estimate the dosage required to achieve a 20% uptake value compared to a blank sample without any integral water repellent admixture. For these test conditions, a 20% water uptake value compared to a blank sample represents the minimum value needed for good water repellency without sacrificing resolution of the test.

FIG. 1 graphically illustrates dose amounts needed to achieve 20% water uptake compared to the blank versus the canola oil content. Based on a simple mixtures rule, one would expect performance to lie on the dotted line connecting the 0% canola oil content and the 100% canola oil content.

However, surprisingly, the optimal canola oil content for this system is between 60 and 90%, suggesting a synergy between oil and silane components.

Example 2

In this example, the water uptake property over time for four integral water repellant admixtures, formulated in accordance with the present invention, are compared to a blank sample without an integral water repellent. The four admixtures were formulated as follows: a 100% octyltriethoxysilane (S); a blend of 50% octyltriethoxysilane and 50% canola oil (C); a blend of 20% octyltriethoxysilane and 80% canola oil; and 100% canola oil. These samples were prepared in the same fashion as those for Example 1. As can be seen, over time, all formulations containing octyltriethoxysilane remain under a water uptake of 30% compared to the blank. However, without any octyltriethoxysilane, the uptake begins to increase dramatically, which may be due to degradation of the canola oil. Surprisingly, a blend including octyltriethoxysilane prevented severe performance decrease, even at a ratio of S/C of 4/1.

Example 3

This example demonstrates air stability in concrete samples. A 1.25 cubic foot cementitious mixture was made using 12,550 grams of cement, 6,530 grams of water, 35,244 grams of coarse aggregate, and 29600 grams of sand: these components were mixed in a drum mixer using the 9-minute mix protocol described in Example 1. After mixing, the air content was measured according to ASTM C231 at two different times after cement and water began to mix: 9 and 30 minutes. Two commercially available water repellants were used and compared to a blend of 50% octyltriethoxysilane (S) and 50% canola oil (C). The first commercially available water repellent contained silane, and the second commercially available water repellent was based on a silane emulsion.

Figure 3:
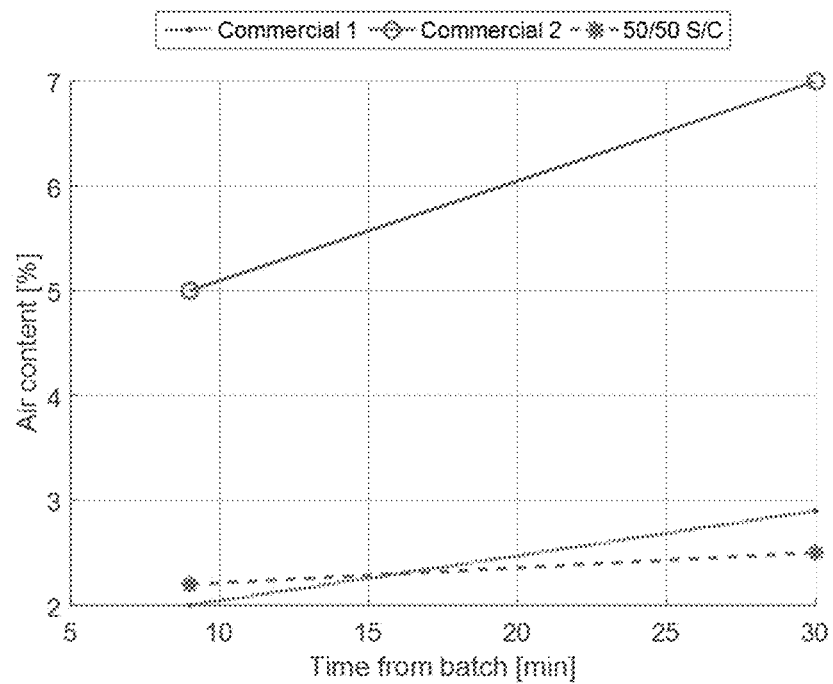
FIG. 3 is a diagram which shows air content change over time of plastic concrete comparing two commercial formulations (PRIOR ART) as compared to an exemplary formulation in accordance with the present invention.

As illustrated in FIG. 3, the air content of the second commercial sample (emulsion) was seen to increase by 2%; whereas the blend of (S+C) according to the present invention experienced only a 0.25% increase in air content. The air content of the first commercial sample experienced an increase of 0.9%.

This example confirmed that the blend of the present invention conferred more stable air content characteristic in cementitious compositions over time.

Example 4

The purpose of this example was to show that the present invention allows a concrete or mortar mix designer to use the admixture of the present invention to control air void size and distribution, and this is done by incorporating a defoamer where needed to decrease air content in the mix, and allowing the designer to incorporate one or more air entraining admixtures to attain a desired size and distribution of air voids in the mix.

Figure 4:
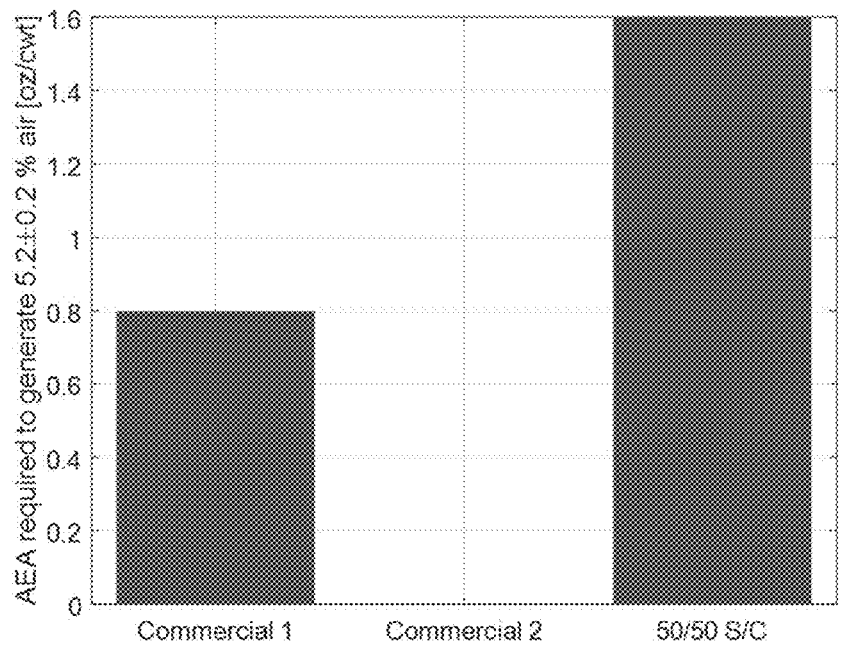
FIG. 4 is a diagram which shows the amount of air entraining agent required to achieve a specific air content in a plastic concrete mix.

The same concrete mix designs and formulations were used as in Example 3. In order to entrain air with the proper size and distribution, a commercial air entrainer was added to achieve an air content of 5.2% (±0.2). In FIG. 4, it can be seen that for the second commercial water repellant, the air content is already at 5.2%, and this means that in order to use an air entrainer, an air defoamer must be first added into the concrete mix.

However, a defoamer is not an integral component of the second commercial water repellant, due to the difficulties of achieving formulation stability between the defoamer and emulsion. Although the first commercial water repellant can incorporate 0.8 ounces per dry weight of cement (oz/cwt), the blend of 50% octyltriethoxyysilane (S) and 50% canola oil (C) required a higher dose (1.6 oz/cwt), which is both easier to dose at the concrete plant due to the sensitive low dosage rates, and which entrains a greater percentage of air with acceptable size and distribution.

Example 5

In this example, the formulation stability is compared between a commercial silane emulsion, and, in accordance with the present invention, a blend of 50% octyltriethoxysilane (S) and 50% canola oil (C). Both samples were placed in a freezer at 23° F. for 12 hours and then allowed to thaw.

Figure 5:
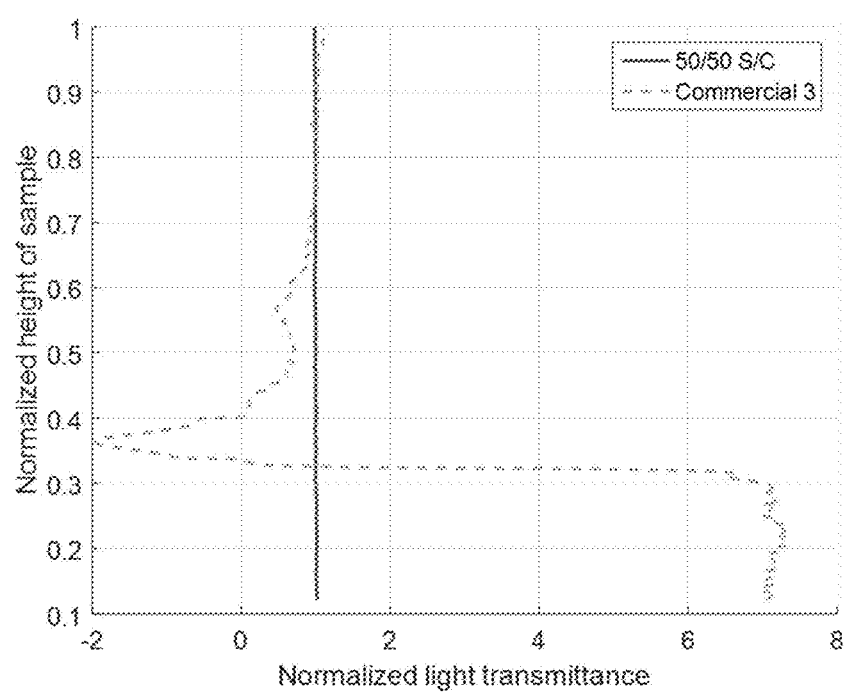
FIG. 5 is a diagram illustrating the formulation stability of a commercial product (PRIOR ART) compared to an exemplary formulation of the present invention.

FIG. 5 shows the results from a turbidimeter, which measures light transmittance through a fluid sample. If the light transmittance does not vary with the height of the sample over time, the formula can be considered stable. However, if the light transmittance does vary after a certain amount of time, then different phases have separated, indicating instability. FIG. 5 shows the light transmittance results, and suggests the instability of the silane emulsion, whereas the silane/oil solution of the present invention maintains a constant light transmittance, indicating greater stability.

Example 6

Several substances were evaluated in the absence of silane, to determine suitability for use in concrete, as blends with silane. The following oils were evaluated in mortar: canola oil, sunflower oil, corn oil, soybean oil, olive oil, peanut oil and coconut oil. Based on slump, air, air growth over 30 minutes and strength at 1, 7 and 28 days, each was found suitable.

The present invention is described herein using a limited number of illustrative embodiments not intended to limit the scope of the invention as otherwise described and claimed herein.

What is claimed is:

1. An admixture composition for integrally waterproofing a cementitious material, comprising:
    (A) an animal oil, a vegetable oil, or derivative thereof chosen from a $C_6$-$C_{30}$ fatty acid, an ester of $C_6$-$C_{30}$ fatty acids, an ethoxylated compound of $C_6$-$C_{30}$ fatty acid, $C_6$-$C_{30}$ fatty amine, $C_6$-$C_{30}$ fatty amide, tall oil derivative, or a mixture thereof;
    (B) an organosilicon having the structural formula chosen from

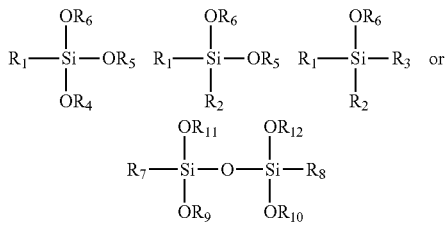

wherein $R_1$ $R_2$ $R_3$ $R_7$ and $R_8$ represent a $C_6$ to $C_{20}$ alkyl group, and $R_4$, $R_5$, $R_6$, $R_9$, $R_{10}$, $R_{11}$, and $R_{12}$ each independently represent a $C_1$ to $C_5$ alkyl group; and
    (C) at least one air defoamer for detraining air from a hydratable cementitious composition, wherein the ratio (A:B) between components (A) and (B) is 99:1 to 50:50 based on weight of components; and
    wherein the ratio (B:C) between components (B) and (C) is 99.9:0.1 to 90:10 based on weight of components.

2. The admixture composition of claim 1 wherein the ratio (A:B) between components (A) and (B) is 98:2 to 40:60 based on weight of components.

3. The admixture composition of claim 2 wherein the ratio (A:B) between components (A) and (B) is 95:5 to 20:80 based on weight of components.

4. The admixture composition of claim 1 comprising a vegetable oil or derivative thereof, the vegetable oil chosen from rapeseed oil, sunflower oil, soy bean oil, castor oil, peanut oil, grape seed oil, corn oil, canola oil, coconut oil, linseed oil, sesame oil, olive oil, palm oil, almond oil, avocado oil, china wood oil, cocoa oil, safflower oil, hemp seed oil, walnut oil, poppy seed oil, oiticaca oil, palm nut oil, *perilla* oil, pecan oil, tung oil, and pine tar oil.

5. The admixture composition of claim 1 comprising a vegetable oil derivative chosen from mono and diglycerides of $C_6$-$C_{30}$ fatty acids, esters of $C_6$-$C_{30}$ fatty acids, ethoxylated compounds of $C_6$-$C_{30}$ fatty acids, $C_6$-$C_{30}$ fatty amines, $C_6$-$C_{30}$ fatty amides, tall oil derivatives, or a mixture thereof.

6. The admixture composition of claim 1 comprising a vegetable oil chosen from canola oil, rapeseed oil, or mixture thereof.

7. The admixture composition of claim 1 wherein the organosilicon is a silane.

8. The admixture composition of claim 7 wherein the silane is octyltriethoxysilane.

9. The admixture composition of claim 1 wherein the air defoamer is chosen from tributyl phosphate, a polyoxyalkylene, a glycol, or a mixture thereof.

10. The admixture composition of claim 1, wherein the composition is devoid of hydroxyl groups.

11. The admixture composition of claim 1 further comprising an admixture chosen from sugars, carbohydrates, water reducers, or mixture thereof.

12. A composition comprising: a cement binder and the admixture composition of claim 1.

13. A method for integrally waterproofing a cementitious material, comprising: introducing to a cement the admixture composition of claim 1.

14. A cementitious composition comprising:
    (A) a cement;
    (B) an animal oil, a vegetable oil, or derivative thereof or mixture thereof;
    (C) an organosilicon having a structural formula chosen from

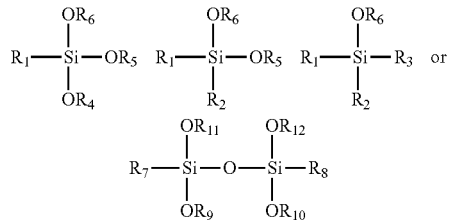

wherein $R_1$ $R_2$ $R_3$ $R_7$ and $R_8$ represent a $C_6$ to $C_{20}$ alkyl group, and $R_4$, $R_5$, $R_6$, $R_9$, $R_{10}$, $R_{11}$, and $R_{12}$ each independently represent a $C_1$ to $C_5$ alkyl group; and
    (D) at least one air defoamer for detraining air in a hydratable cementitious composition;
    wherein the weight ratio (B:C) between components (B) and (C) is 99:1 to 50:50 based on weight of these components;
    wherein the weight ratio (C:D) between components (C) and (D) is 99.9:0.1 to 90:10 based on the weight of these components; and
    wherein the weight ratio (A:B+C+D) of component (A) to components (B), (C), plus (D) is 1:0.02 to 1:0.15 based on the weight of these components.

15. The cementitious composition of claim 14 wherein the weight ratio (B:C) between components (B) and (C) is 98:2 to 40:60.

16. The cementitious composition of claim 14 wherein the weight ratio (B:C) between components (B) and (C) is 95:5 to 20:80.

17. The cementitious composition of claim 14 comprising oil derivatives chosen from butyl and 2-ethyl hexyl esters of palmitic, stearic, oleic and lauric acids.

* * * * *